M. M. LLOYD.
PACKING RING.
APPLICATION FILED MAY 7, 1913.

1,213,217.

Patented Jan. 23, 1917.

Witnesses:
L. B. Graham
Gustav Drews

Inventor:
Melvin Marion Lloyd.
By Wallace R. Lane
Att'y.

UNITED STATES PATENT OFFICE.

MELVIN MARION LLOYD, OF DES MOINES, IOWA.

PACKING-RING.

1,213,217.  Specification of Letters Patent.  Patented Jan. 23, 1917.

Application filed May 7, 1913. Serial No. 766,081.

*To all whom it may concern:*

Be it known that I, MELVIN MARION LLOYD, a citizen of the United States, residing at Des Moines, in the county of Cook and State of Iowa, have invented certain new and useful Improvements in Packing-Rings, of which the following is a specification.

The present invention relates to packing rings for use on the pistons of oil, gas or steam engines to maintain at all times a gas or vapor tight connection between the piston and the wall of the cylinder within which the piston slides.

More particularly the present invention aims to effect a tight packing of the piston without undue pressure on the wall of the cylinder or undue friction in the piston's movements while at the same time a gas or vapor proof joint is maintained.

To this end, the packing ring of the present invention is made in two parts, one lying or seated within the other, each part being slit through to permit its expansion and contraction to facilitate installation of the ring on the piston and to compensate for wear and changes in diameter of the cylinder and the two members are so assembled and grouped with respect to one another that they supplement one another in maintaining a tight joint while permitting freedom of motion.

It is also an object of the invention to provide a packing ring which is comparatively inexpensive to manufacture because of the cheapness of the material, and the simplicity of mechanical operations involved in the production and installation of the device.

The above and other features and advantages of the invention will become apparent from a detailed description of the accompanying drawings in which—

Figure 1:
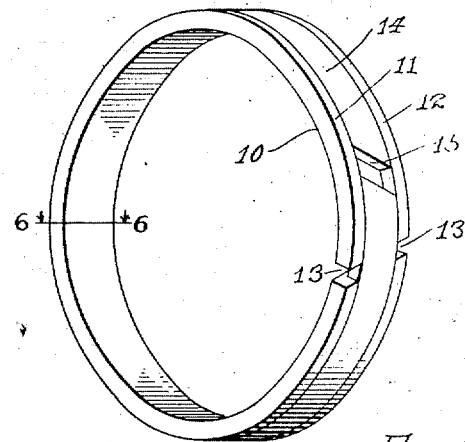
Figure 2:
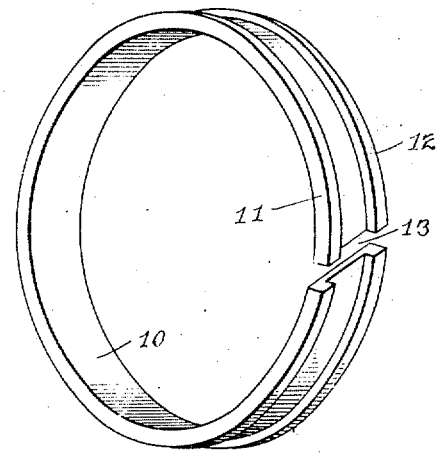
Figure 5:
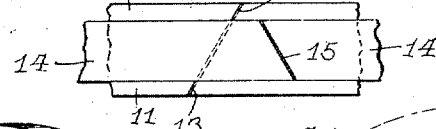
Figure 3:
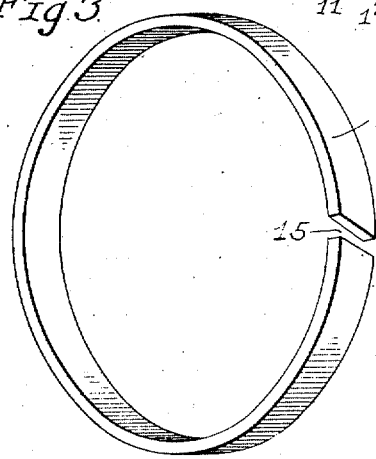
Figure 4:
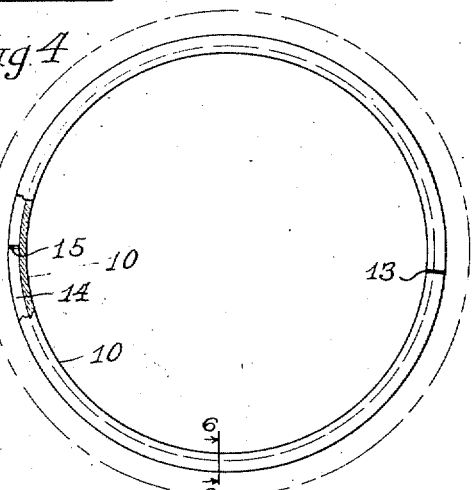
Figure 6:
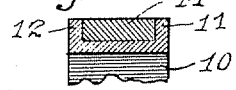

Figure 1 is a perspective view of the packing ring before being placed in the cylinder of a piston chamber. Fig. 2 is a perspective of the base member of the packing ring. Fig. 3 is a perspective of the filling member or ring. Fig. 4 is an elevation showing the complete ring in position in a cylinder. Fig. 5 is a plan view of a portion of the complete ring showing the respective positions which may be assumed by the openings of the rings when in position in a cylinder, and Fig. 6 is a cross-section of the packing ring on the line 6—6 of Figs. 1 and 4.

In the construction shown, the complete packing ring is made up of two distinct members, a retaining member and a filling member. Both may be cast iron and both may be made up by ordinary machine shop operations. The retaining ring 10 is preferably turned up as a complete endless ring having a plain inner surface for contact with the bottom of a groove in the engine piston and having its outer face formed with two flanges 11 and 12 along the edges with a recess therebetween for the reception of the outer or filling member or ring. Ring 10 after being thus shaped up can be cut across at 13 with a diagonal cut as shown in Fig. 5 and preferably, the width of the gap at 13 is such that when the packing ring is in use and has been expanded by the heat within the cylinder, the ends at 13 will just contact to form one continuous band. But even though there be a gap at 13, the packing ring will still be effective, for in use it is seated well within the usual annular groove of the piston head and furthermore, the gap at 13 is in large measure protected and filled by the inner or filling member or ring which will now be described.

The filling ring 14 is rectangular in cross-section and may be made of cast iron and is of such size as to just fill the rectangular groove formed in ring 10 between its annular flanges 11 and 12, the thickness of ring 14 being such that its outer face lies flush with the flanges 11 and 12. The gap or transverse cut 15 of the inner filling ring is diagonal as shown in Fig. 5 but cuts across in the opposite direction from that of the lower ring so that even if these gaps should happen to lie one above the other, there will be no opening through which gases liquids or vapors could pass the piston head. The inner ring 14 fits its supporting ring with a true fit and with just sufficient clearance to permit it to be slid around as desired to properly position the diagonal cut 13 with respect to cut 15. Fig. 4 illustrates a proper relative position between the two gaps though it will be understood that under the effect of heat in the cylinder, these gaps may be substantially closed. Owing to the interlocked relation between the two members, and to the effective bearing which each member has with the inner wall of the cylinder, there is no warping of the rings from circular to oval shape and the wear on the cylinder is equally distributed throughout the circumference of the piston and the bearing faces or areas of contact between the piston and cylinder are broad and extensive enough to insure even wear. With the embodiment shown, the arrangement is such that substantially no vapor or gas can pass the ring either between the rings and the cylinder or through the openings or slits of the rings. Any tendency which the heat of the cylinder may have to distort the rings into oval shape of unequal pressure will be overcome by the interlocked relation of the rings and by the freedom with which the inner ring may be slid around into any desired position with respect to the slot of its supporting ring.

While there is herein shown and described only one embodiment of the invention, it is to be understood that various changes and modifications may be made by those skilled in the art without departing from the scope of the invention as defined in the appended claims.

Having thus described my invention, what I claim and desire to secure by Letters Patent is:

1. A packing ring comprising an expansible divided body portion having a groove in its outer surface and a split expansion ring slidably mounted in said groove.

2. A packing ring having an open base ring, the ends of said base ring forming a diagonal slot, and an open filling ring adapted to slide on said base ring, the ends of said filling ring also forming a diagonal slot, said slots when the rings are assembled running in opposite directions so that a tight connection is assured at all times.

3. A packing ring having an open base ring, the ends of said base ring forming a diagonal slot, a groove in the outer periphery of said base ring, and an open filling ring adapted to slide in said groove, the ends of said filling ring also forming a diagonal slot, said slots when the rings are assembled running in opposite directions so that a tight connection is assured at all times.

4. A packing ring having an open base ring, a groove in the outer periphery of said base ring, and an open filling ring slidably mounted in said groove so that the openings of the two rings can be positioned one hundred and eighty degrees apart thereby to equalize the pressure throughout the rings.

5. A packing ring comprising a one-piece expansible body portion, split at one point, said body portion being provided in its outer surface with a groove, a split expansion ring slidably mounted in said groove, all so constructed and arranged that it is impossible for said expansion ring to assume such a position with relation to said body portion that the joints between the ends of said parts aline.

In witness whereof, I hereunto subscribe my name to this specification in the presence of two witnesses.

MELVIN MARION LLOYD.

Witnesses:
W. C. LANE,
ANNA COOK.

It is hereby certified that in Letters Patent No. 1,213,217, granted January 23, 1917, upon the application of Melvin Marion Lloyd, of Des Moines, Iowa, for an improvement in "Packing-Rings," an error appears in the printed specification requiring correction as follows: Page 1, line 4, for the words "county of Cook" read *county of Polk;* and that the said Letters Patent should be read with this correction therein that the same may conform to the record of the case in the Patent Office.

Signed and sealed this 6th day of March, A. D., 1917.

[SEAL.]

F. W. H. CLAY,
*Acting Commissioner of Patents.*

Cl. 121—108.